United States Patent [19]

Malinski et al.

[11] 4,014,375
[45] Mar. 29, 1977

[54] THRUST-APPLYING MECHANISM FOR TIRE CHANGING APPARATUS

[75] Inventors: S. W. Malinski, Tamaroa; Thomas L. Mueller; Jerome A. Gross, both of St. Louis, all of Mo.

[73] Assignee: S. W. Malinski, Tamaroa, Ill.

[22] Filed: Nov. 5, 1975

[21] Appl. No.: 629,017

[52] U.S. Cl. .............................................. 157/1.17
[51] Int. Cl.$^2$ ....................................... B60C 25/06
[58] Field of Search ............... 157/1.17, 1.21, 1.33; 254/93 R

[56] References Cited

UNITED STATES PATENTS

| | | | |
|---|---|---|---|
| 3,170,672 | 2/1965 | Stoneberg | 254/93 R |
| 3,489,198 | 1/1970 | Malinski | 157/1.17 |
| 3,612,140 | 10/1971 | Malinski | 157/1.17 |
| 3,658,110 | 4/1972 | Koziar | 157/1.21 |

Primary Examiner—Al Lawrence Smith
Assistant Examiner—James G. Smith

[57] ABSTRACT

In that type of apparatus for mounting the largest sizes of pneumatic tires on drop-center wheels, where thrust is applied slantingly to drive one of the tire beads into the drop-center of the wheel preparatory to use of contra-rotating bead deflectors, the present invention provides for applying and manipulating such thrust forces with exceptional ease. Two hydraulic struts of equal size are mounted in a vertical plane, with their pistons extending to fittings on a common lateral shaft. The fitting of one actuator is a clevis which surrounds the fitting of the first. Their remote ends are spaced vertically, so that the thrust at the shaft is reacted truss-like by the triangulated cylinders. On the lateral shaft is mounted a thrust shoe, whose angle may be fixed perpendicular to either actuator; or it may be varied relative to one of the actuators by a hydraulic motor. By varying the length of the extension of the actuators, the shoe is moved at any chosen direction in the vertical plane. Using the hydraulic motor to vary the angle of the thrust shoe affords to the operator a new manipulative control over the thrust force.

7 Claims, 6 Drawing Figures

THRUST-APPLYING MECHANISM FOR TIRE CHANGING APPARATUS

BACKGROUND OF THE INVENTION

Large off-highway sizes of pneumatic tires may be mounted on and demounted from drop-center wheels by using apparatus which applies a thrust slantingly to one side wall of the tire to drive its bead into the dropcenter of the wheel and to shift that side wall beyond center, drawing the bead out of round. Two contrarotating bead deflectors then deflect the bead over the rim edge progressively, starting adjacent to the point of thrust application. Such apparatus is shown in U.S. Pat. Nos. 3,489,198 and 3,612,140. The thrust-applying cylinder is mounted on a turret rotatable about a horizontal axis, and is directed slantingly upward when its force is applied to the lower side wall of the tire, and slantingly downward when applied to the upper side wall. A shoe mounted rigidly on the end of the thrust cylinder is applied to the tire tread at one of the side walls, to exert the required force. A supplemental strut, used to change the angle of the cylinder, is pinned to its forward end, its aft end is secured to the turret at a vertical spacing from the thrust cylinder. Any load developed in the supplementary strut imposes undesirable bending stresses on the thrust-applying cylinder.

SUMMARY OF THE INVENTION

The purposes of the present invention include providing improved thrust-applying mechanism capable of applying both upward slanting and downward slanting thrust forces without turning over the thrust-applying mechanism. A further purpose is to provide a single shoe adapted to cooperate with two linear actuators. An additional purpose is to manipulate the tire being mounted by varying the angle at which such thrust forces are applied without adjusting the distance between the thrust cylinder ends and the tire rim. Still further purposes will appear from the following.

These objects are accomplished in the manner more fully described in the description hereafter, but which may be generally summarized, without limitation, as follows.

Two equal size linear actuators are mounted in a vertical plane, with their ends remote from the rim pinned to upper and lower mounting points of a thrust-reacting structure. Their pistons extend to fittings on a common lateral shaft; the fitting on one actuator is in the vertical plane; that on the other is a clevis surrounding the fitting of the first. By controlling the lengths of extension of the two actuators, their common lateral shaft is moved in any direction in the vertical plane, the thrust at the shaft being reacted truss-like by the triangulated cylinders.

On this common lateral shaft a thrust shoe is supported. In the preferred embodiment it is positioned by hydraulic mechanism at a variable angle relative to one of the linear actuators. The hydraulic mechanism which adjusts and varies the angle of the shoe is more than a substitute for the prior art reversible turret; it adds a manipulative control to the tire-mounting process. In an alternate embodiment the thrust shoe may be pinned to the piston of either actuator, in a position substantially perpendicular to it.

DESCRIPTION OF THE PREFERRED EMBODIMENT

Figure 1:
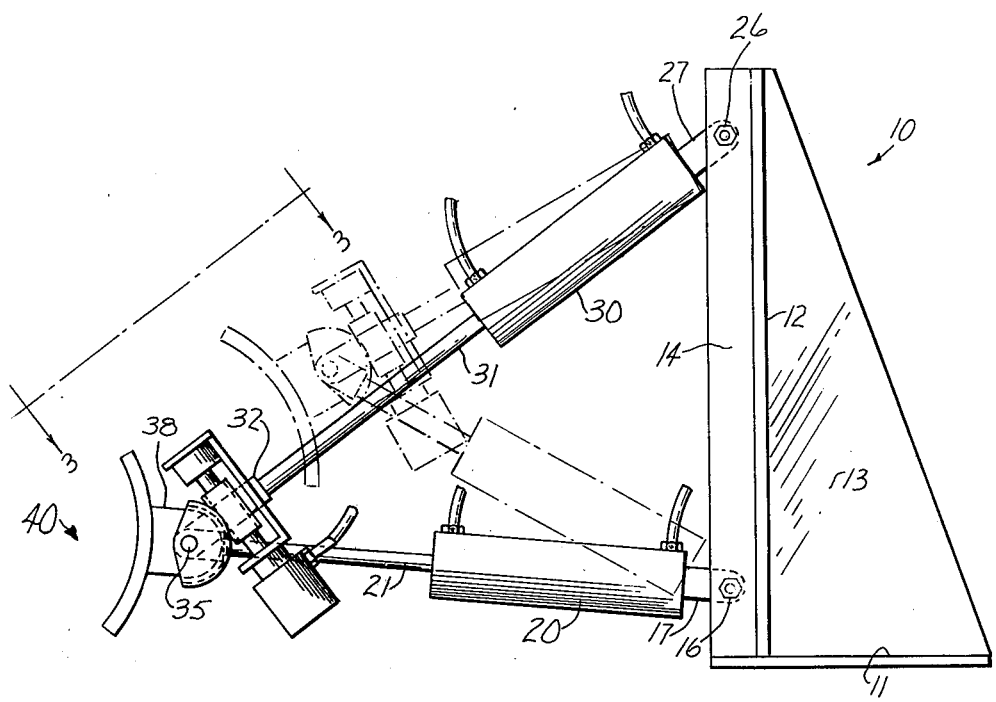
FIG. 1 is a side elevation of thrust-applying mechanism embodying the present invention, showing the upper hydraulic cylinder fully extended and the lower cylinder partially so, with the thrust shoe perpendicular to the lower cylinder. The phantom lines illustrate the position of these cylinders when substantially fully retracted, with the thrust-applying shoe turned to be substantially perpendicular to the upper cylinder.

This description relates only to the thrust-applying mechanism to be utilized with the type of apparatus such as is shown in the prior patents referred to.

Generally describing such apparatus, a platform structure is provided on which a drop-center wheel or rim may be chucked or otherwise clamped with its midplane horizontal. The vertical center plane of the new mechanism to be described is positioned radially to the rim. Contra-rotating shafts rising near the center of the rim have radially outstanding arms terminating in bead deflectors. Mechanism is provided to rotate these bead deflectors simultaneously in opposite directions around the periphery of the upper edge of the rim.

In using such apparatus to mount a tire onto a rim so supported, the tire is placed so that its lower bead overhangs the rim on that side which the thrust-applying mechanism (to be described) faces. The thrust-applying mechanism is so manipulated that its shoe presses against the tread of the tire at the lower sidewall, forcing the lower bead into the drop-center of the rim and pressing somewhat slantingly upward to buckle the tire sidewall at the point of force application. This effectively drives the remainder of the lower sidewall of the tire to a position somewhat beyond center, drawing the lower bead against the drop-center portion of the rim and pulling it out of round. The contra-rotating bead deflectors are then utilized, commencing adjacent to the point of thrust application and continuing simultaneously in opposite directions around the rim, to deflect the lower bead over the rim.

The thrust-applying mechanism is then repositioned to exert downward a slanting thrust on the tread adjacent to the upper sidewall, driving the upper bead into the drop center of the wheel, similarly shifting the upper sidewall of the tire to beyond center. This shifting pulls the upper bead somewhat out of round. The two bead deflectors then act on the upper tire bead, commencing at substantially the point of thrust application and continuing simultaneously in opposite directions, to deflect the bead over the upper rim of the wheel.

The present improved thrust-applying mechansim will now be described.

The thrust-reacting structure of the present invention may be any structure suitable for reacting the force of hydraulic actuators, to be described, while positioning their ends spacedly in a central vertical plane. Such structure is generally designated 10 in FIGS. 1 and 2. It includes a heavy horizontal base plate 11, suitable for securement to longitudinal beams extending from the wheel-mounting platform previously referred to. A substantially triangular vertical plate 12 with its apex at the top, is welded along its lower edge near to the edge of the base plate 11 on the side nearest the wheel-mounting platform. The vertical plate 12 is supported at its aft side by heavy triangulated gusset plates 13. Along its side opposite to the gusset plates 13 is a heavy vertical channel 14. The vertical plane which bisects the channel 14 is referred hereinafter as the central vertical plane a—a.

Figure 2:
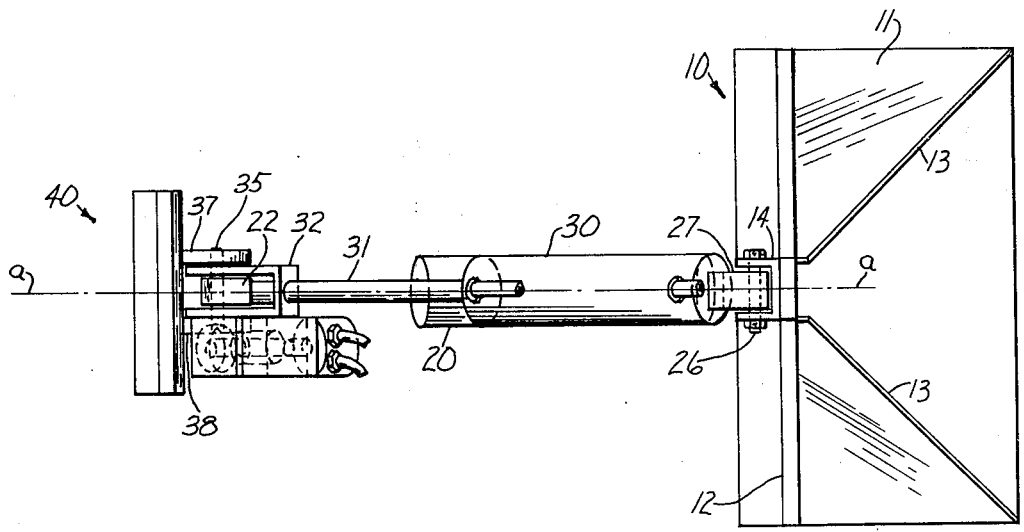
FIG. 2 is a plan view of the FIG. 1 assembly.

In this plane, pivot-mounted by a lateral bolt 16 near the lower end of the channel 14, is the fixed end fitting 17 of a lower double-acting hydraulic cylinder 20, whose piston 21 extends to the left as shown in FIG. 1. On the left end of the piston 21 is a laterally bored fitting 22 which is referred to as the central plane fitting.

Similarly mounted near the upper end of the channel 14 by a lateral bolt 26 is the fixed end fitting 27 of an upper double-acting hydraulic cylinder 30 which preferably is the same size as the lower cylinder 20. Its piston 31 extends to the left as shown, terminating in a large clevis fitting 32 which extends outward from the central plane a—a to both sides of the central plane fitting 22 on the lower piston 21. Like the lower fitting 22 it is bored laterally.

Figure 3:
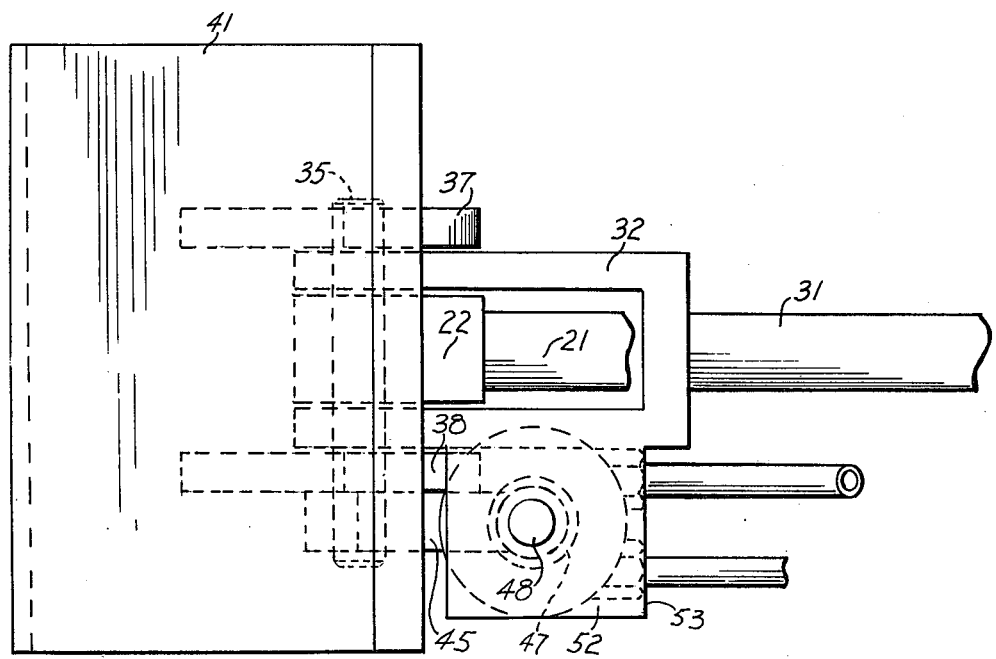
FIG. 3 is an enlarged detail view of the mechanism seen along line 3—3 of FIG. 1.

A common shaft 35 extends through these lateral bores of both fittings 22 and 32, extending sufficiently beyond the clevis fitting 32 to mount similarly bored yoke plates 37, 38 which comprise the pivoted yoke of the thrust-applying shoe generally designated 40. As seen in the enlarged detail views FIGS. 3 and 4, the yoke plates 37, 38 may simply be welded to the aft side of a shoe plate 41.

In the embodiment illustrated the plate 41 is a heavy steel plate, curved to a gentle radius. Its curving shape avoids slippage when the forward face of the plate 41 is pressed against a tire.

By mounting the fittings 22, 32 on the common shaft 35, a point is established in the central plane a—a relative to which either or both actuators 20, 30 may apply thrust, to be reacted substantially truss-like through said actuators held triangulated by the thrust-reacting structure 10. By adjusting the extension or retraction of the actuators 20, 30 either together or relative to each other, the point and direction of thrust application may be moved within this plane over a broad area limited by the extensible length of the actuators, two of such positions being shown in FIG. 1. If the thrust is to be applied precisely in line with either actuator 20, 30, the other will be under no load. If the thrust vector does not coincide with the center line of either actuator, both will transmit the load, in varying shares, to the reacting structure 10.

In order to utilize the triangulated actuators 20, 30, one problem was to provide means by which thrust on the shoe 40 might be transferred without rotation to the common shaft 35; another problem was to provide means to establish the angle of the thrust shoe 40 relative to either or both actuators and to vary that angle.

Figure 4:
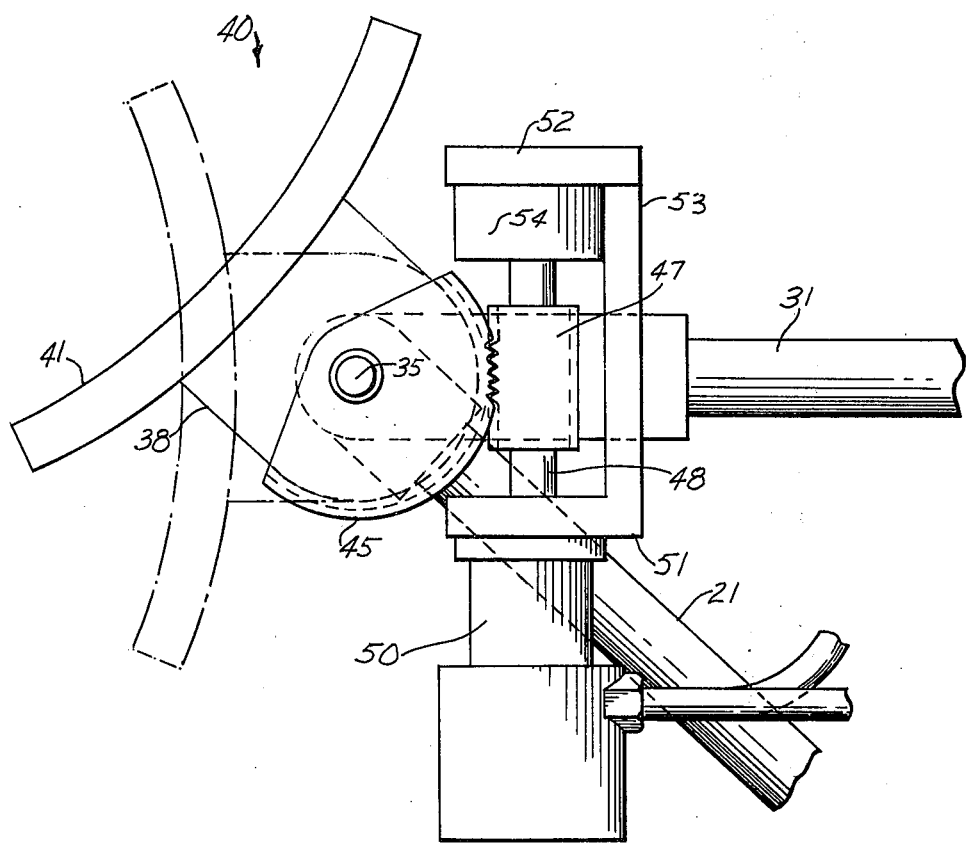
FIG. 4 is a side view of FIG. 3. The phantom lines show the thrust applying shoe rotated into perpendicularity with the upper piston.

In the preferred embodiment, the mechanism utilized includes a sector 45 mounted on the yoke plate 38, best seen in FIG. 4, in an arcuate path around the shaft 35. The sector 45 extends radially somewhat beyond the yoke plate 38. Its teeth are engaged by a worm gear 47 mounted on the drive shaft 48 of a hydraulic motor generally designated 50. The shaft 48 passes through the lower and upper plates 51, 52 of a generally C-shaped bracket 53 which may be welded to the side face of the clevis fitting 32. The end of the shaft 48 remote from the hydraulic motor 50 is mounted in a bearing 54.

Like the lower and upper cylinders 20, 30, the motor 50 is powered from a hydraulic accumulator through conventional controls, not shown. The motor 50 is reversible, so that by the worm and sector mechanism 45, 47 the shoe 40 may be rotated in either direction for best control of its thrust. Thus solid lines of FIG. 4 show the shoe positioned substantially perpendicular to the lower piston 51, while phantom lines illustrate rotation of the shoe to substantial perpendicularity with the upper piston 31.

Figure 5:
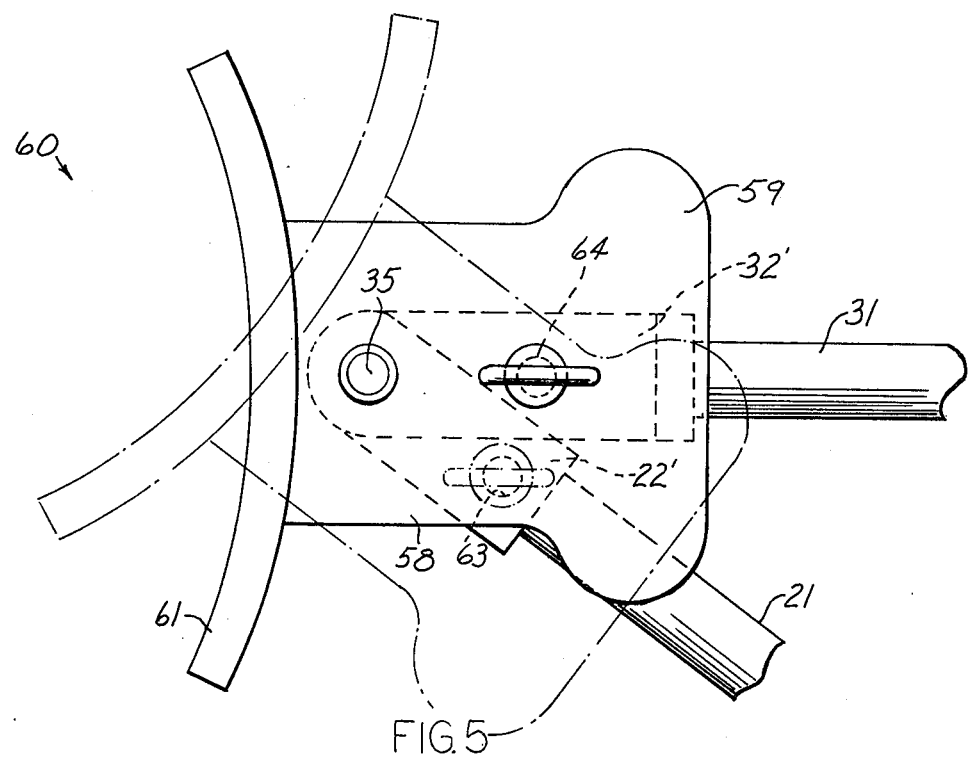
FIG. 5 is an enlarged detail side view (corresponding in this respect to FIG. 4) of an alternate embodiment in which the thrust shoe is shown pinned to the actuator of the lower cylinder. The phantom lines show it rotated and pinned to the actuator of the upper cylinder.
Figure 6:
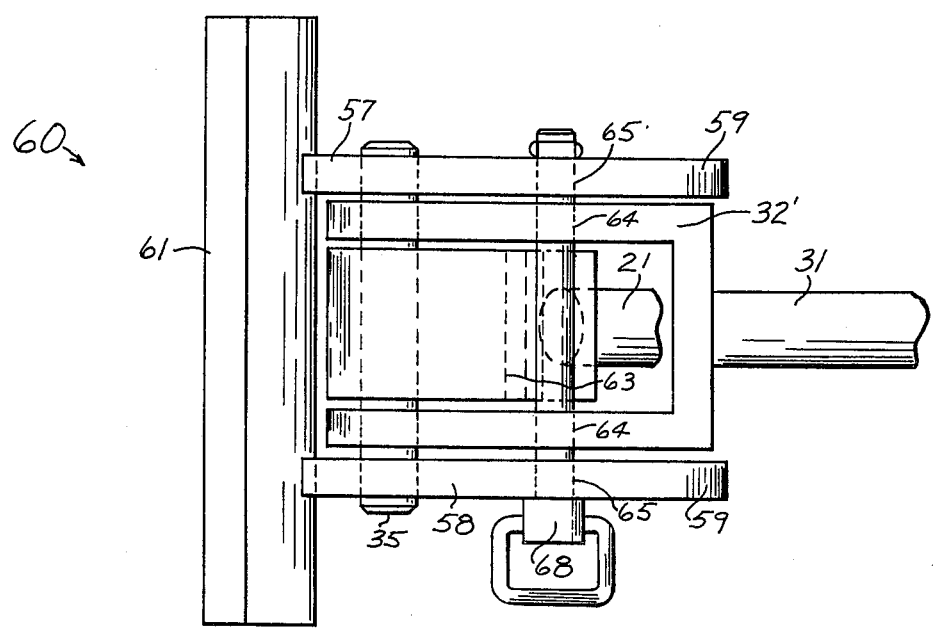
FIG. 6 is a plan view of the embodiment of FIG. 5.

In use this hydraulic means to control the shoe is of particular importance. First, it makes it unnecessary to provide a reversible turret, as shown in said prior patents, because the shoe 40 may be positioned to serve as an effective extension of either of the two cylinders 20, 30. Additionally, the operator can manipulate the tire, at the point of application of the thrust force, by varying the angle of the shoe 40 without changing the length of the cylinders 20, 30.

Where it is deemed that such manipulative control is not required, the mechanism shown in FIGS. 5 and 6 may be utilized. A thrust shoe generally designated 60, whose plate 61 is curved like the plate 41, has welded to its rear surface a pair of yoke plates 57, 58 which include extended counterbalancing portions 59. Their weight at least partly counter-balances the weight of the plate 61 about the lateral shaft 35. In this embodiment, the center plane fitting 22' of the lower piston 21 has a lateral bore 63 spaced from the shaft 35 and extending parallel to it. At a similar spacing, the clevis fitting 32' of the upper piston 22 has a lateral bore 64 of the same diameter through both arms of the clevis. At a similar spacing, the yoke plates 57, 58 which extend from the shoe plate 51 have similar sized bores 65.

A coupling pin 68, which may be a conventional ball pin, is of such diameter as to fit through the bores in the yoke plates 57, 58 and in one or the other of the fittings 22', 32'. In FIG. 5, the coupling pin 68 is shown inserted through the bores 64 of the clevis 32', to hold the thrust shoe 60 substantially perpendicular to the upper piston 31. The phantom lines illustrate the thrust shoe 60 repositioned after removing the coupling pin 68, tilting the shoe 60, and re-inserting the pin 68 through the bore 63 in the center plane fitting 22'. The heavy lobes 59 which partly counter-balance the shoe plate 61 reduce the effort which the operator must exert in holding and moving the shoe 60 to effect such re-positioning when the pin 68 is removed.

In this alternative embodiment of FIGS. 5 and 6, as well as in the hydraulically operated embodiment, the thrust on the common shaft 35 is reacted substantially truss-like through the two actuators 20, 30 and the thrust-reactiong structure 10. In each embodiment, the same shoe 40, 60 serves alternately as the effective end of either of the two actuators holding the shoe at a desired angle relative to either of them. However, in the embodiment first described, the ability of the operator to vary the angle of the shoe as its thrust is being applied provides the present thrust-applying mechanism with a manipulative function not present in the prior art.

In this description, the shoes 40, 60 have been referred to from time to time as being perpendicular to the cylinders 20, 30 or their pistons 21, 31. The term "perpendicular" is intended to apply to thrust shoes of any shape, and is used, imprecisely and in a non-technical sense, to mean any position measured from the thrust axis of a cylinder, in which a shoe will exert the thrust from that cylinder without being deflected strongly sideward. In the embodiment of FIGS. 5 and 6, it may be desirable to add additional bores through the yoke plates 57, 58 angularly removed from bore 65; such variation is to be deemed within the scope of this disclosure.

Further from this disclosure these and other variations will be apparent, and it will be obvious to persons skilled in the art how to make engineering changes to adapt the present mechanism to design criteria which may be present.

We claim:

1. In apparatus for changing tires on drop-center wheels of the type which employs the process in which thrust forces are applied to a tire slantingly in a vertical plane,
   improved thrust-applying mechanism comprising
   fixed thrust-reacting structure having an upper pivot mounting point extending perpendicular to a central vertical plane, and a lower, similarly-extending pivot mounting point spacedly therebeneath,
   an upper linear actuator of the extensible-retractable type whose axis lies in said vertical plane, having a fixed end mounted to said upper pivot mounting point,
   a similar lower linear actuator mounted therebeneath in said vertical plane, having a fixed end mounted to said lower pivot mounting point,
   one of said linear actuators having at its opposite extensible end a fitting in said central plane,
   the other of said actuators having at is corresponding opposite end a clevis fitting outward of the central plane fitting of said last-mentioned actuator,
   a common shaft on which the said central plane fitting and clevis fitting are pivotally mounted, whereby to establish a point movable in said central plane relative to which either or both said actuators may apply thrust,
   a thrust-applying shoe, and
   rotation-resisting means mounting said shoe on said common shaft so as to transfer thrust from such central plane point,
   whereby the thrust exerted at said common shaft is reacted substantially truss-like through the two actuators to said thrust-reacting structure.

2. Thrust-applying mechanism as defined in claim 1, wherein
   the rotation-resisting means to mount the shoe includes a pivoted yoke mounted on said shaft.

3. Thrust-applying mechanism as defined in claim 2, wherein
   the rotation-resisting means to mount the shoe further includes
   means offset from said shaft to couple the yoke to the fitting at the extensible end of one of said actuators at an angle determinable relative to the axis of said actuator.

4. Thrust-applying mechanism as defined in claim 3, wherein
   said rotation-resisting means includes controllable means to vary said angle.

5. Thrust-applying mechanism as defined in claim 4, wherein
   said controllable means includes
   a sector mounted on said yoke in an arcuate path about said shaft,
   a gear engaging said sector, and
   motor means, mounted to the extensible end of that actuator relative to which the angle is determinable, to drive said gear and sector.

6. Thrust-applying mechanism as defined in claim 3, wherein said means offset from the shaft to couple the yoke includes
   a lateral bore in the yoke spaced from and extending parallel to the shaft,
   similarly spaced parallel bores in the fittings of each of the actuators, and
   a coupling pin engageable through the bore in the yoke selectively to the bore in the fitting of either actuator,
   whereby to hold the shoe at a fixed angle relative to the axis of that actuator so engaged.

7. Thrust-applying mechanism comprising
   thrust-reacting means having a pair of pivot mounting points on parallel axes,
   a pair of linear actuators, one end of each being mounted to one of said pivot mounting points,
   the other ends of said actuators having bored fittings,
   a common shaft through the bored fittings of said actuators,
   whereby said common shaft and pivot mounting points hold said acuators in a plane and whereby the intersection of the shaft with said plane is moveable therein on extending and retracting said actuators relative to each other,
   a thrust-applying shoe pivot-mounted on said shaft, and
   controllable rotation-resisting means, operably connected between said shoe and one of said actuators, to fix and vary the angle at which said thrust-applying shoe is held relative to said actuator.

* * * * *